(12) United States Patent
Kukalyekar et al.

(10) Patent No.: US 9,321,888 B2
(45) Date of Patent: Apr. 26, 2016

(54) BRANCHED POLYAMIDE

(75) Inventors: Nileshkumar Prakash Kukalyekar, Echt (NL); Zhujuan Wang, Echt (NL); Rudy Rulkens, Echt (NL); Godefridus Bernardus Wilhelmus Leonardus Ligthart, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/130,612

(22) PCT Filed: Jun. 26, 2012

(86) PCT No.: PCT/EP2012/062328
§ 371 (c)(1),
(2), (4) Date: Apr. 21, 2014

(87) PCT Pub. No.: WO2013/004548
PCT Pub. Date: Jan. 10, 2013

(65) Prior Publication Data
US 2015/0148518 A1    May 28, 2015

(30) Foreign Application Priority Data
Jul. 1, 2011    (EP) .................................... 11005403

(51) Int. Cl.
| | |
|---|---|
| *C08G 69/26* | (2006.01) |
| *C08L 79/02* | (2006.01) |
| *C08G 69/28* | (2006.01) |
| *C08G 69/30* | (2006.01) |
| *C08G 69/36* | (2006.01) |
| *C08L 77/06* | (2006.01) |
| *B29C 47/00* | (2006.01) |
| *B29C 49/00* | (2006.01) |
| *B29K 77/00* | (2006.01) |
| *B29L 22/00* | (2006.01) |

(52) U.S. Cl.
CPC .......... *C08G 69/265* (2013.01); *B29C 47/0004* (2013.01); *B29C 49/0005* (2013.01); *C08G 69/28* (2013.01); *C08G 69/30* (2013.01); *C08G 69/36* (2013.01); *C08L 77/06* (2013.01); *C08L 79/02* (2013.01); *B29K 2077/00* (2013.01); *B29L 2022/00* (2013.01)

(58) Field of Classification Search
CPC .................................. C08L 77/06; C08L 79/02
See application file for complete search history.

(56) References Cited

U.S. PATENT DOCUMENTS

| 3,304,289 A | 2/1967 | Ballentine et al. |
| 4,892,927 A | 1/1990 | Meyer et al. |
| 5,440,006 A | 8/1995 | Lahary et al. |
| 5,760,163 A | 6/1998 | Fisch et al. |
| 6,566,486 B1 | 5/2003 | Joachimi et al. |
| 2004/0113308 A1 | 6/2004 | Clement |
| 2006/0040091 A1 | 2/2006 | Bletsos et al. |

FOREIGN PATENT DOCUMENTS

| EP | 0 191 746 | 8/1986 |
| GB | 1 226 944 | 3/1971 |
| JP | 52-032944 | 3/1977 |
| JP | 11-504088 | 4/1999 |
| JP | 2008-510640 | 4/2008 |
| WO | WO 03/062302 | 7/2003 |
| WO | WO 2007/113262 | 10/2007 |
| WO | WO 2009/040436 | 4/2009 |

OTHER PUBLICATIONS

International Search Report for PCT/EP2012/062328, mailed Sep. 11, 2012.
Written Opinion of International Searching Authority for PCT/EP2012/062328, mailed Sep. 9, 2012.
Database WPI, Week 197732, Accession No. 1977-56242Y & JP 52-032944, (Mar. 12, 1977), Abstract, 2 pages.

*Primary Examiner* — Gregory Listvoyb
(74) *Attorney, Agent, or Firm* — Nixon & Vanderhye P.C.

(57) ABSTRACT

The invention relates to a branched polyamide prepolymer obtained or obtainable by polymerization of a polyamide forming monomer mixture, comprising AA-BB repeat units and branching units derived from diamines (monomer A) dicarboxylic acids (monomer B), and/or a salt of A and B, and a higher functional monomer (monomer C) present in a molar amounts defined by formula I and formula II: MC=(Q/FC)*(MA+MB) (Formula I) and R=((MA*2)+(MC*FCA))/((MB*2)+(MC*FCB)) (Formula II) wherein—MA, MB and MC represent the molar amounts of repeat units derived from the monomers A, B and C, respectively; —FC represent the functionality of monomer C, and is equal to FC-A+FC-B; —FC-A is the number of the amino functional groups comprised by monomer C; —FC-B is the number of carboxyl functional groups or precursor groups thereof comprised by monomer C; —Q is a number in the range of 0.06-1.00; and —R is a number in the range of 0.7-1.3, which polyamide prepolymer has a viscosity number (VN), measured according to ISO 307, in the range of 7-30 mL/g. The invention also relates to a process for preparing a branched polyamide polymer, comprising (1) a melt-mixing step wherein an essentially linear polyamide (pre)polymer and a branched polyamide prepolymer are provided to and mixed and heated in a melt mixing apparatus, thereby forming a mixed melt, and the mixed melt being cooled, thereby forming a solid mixture; and (2) a solid state post condensation step wherein the solid mixture is post-condensed at elevated temperature in the solid state, thereby forming a high molecular weight branched polyamide polymer.

4 Claims, No Drawings

BRANCHED POLYAMIDE

This application is the U.S. national phase of International Application No. PCT/EP2012/062328, filed 26 Jun. 2012, which designated the U.S. and claims priority to EP Application No. 11005403.8, filed 1 Jul. 2011, the entire contents of each of which are hereby incorporated by reference.

The present invention relates to branched polyamides, a process for producing the branched polyamides and use of the branched polyamides in different applications. The invention in particular relates to branched AA-BB type polyamides, i.e. polyamides primarily based on diamines (AA type monomers) and dicarboxylic acids (BB type monomers).

According to the present invention, there are provided a branched prepolymer, a process for the production of the branched prepolymer, and a process wherein the branched prepolymer is used to prepare the branched polymer. The present invention further provides processes for the use of the branched polyamides obtained therefrom in shaping processes and applications such as, for example, injection moulding, extrusion, extrusion blow moulding, suction blow moulding and thermoforming.

Polymers used in extrusion blow moulding, suction blow moulding should be easily processable meanwhile exhibiting very high melt viscosities at low shear rates. Generally, branched polymers are used herein. Such polymers should be producible on industrial scale in an economical and preferably readily controllable manner in a short reaction time and under mild conditions.

Polyamides are a class of polymers which have proven successful for many years. They are characterised in particular by easy processability, very good mechanical properties, very good electrical properties, elevated heat resistance, good resistance to chemicals and very good surface quality.

Polyamides may be produced using various processes and be synthesised from very many different units and, alone or in combination with processing auxiliaries, stabilisers, polymeric alloying components (for example elastomers) or also reinforcing materials (such as for example mineral fillers or glass fibres), may be provided with specific combinations of properties to yield materials for specific applications. The large number of possible combinations makes it possible to create a very large number of products having the most varied properties.

Numerous processing methods are known for the production of polyamides, wherein, depending upon the desired finished product, different monomer units, and various chain-transfer agents to establish the desired molecular weight or also monomers having reactive groups for subsequently planned post-treatments.

Industrially significant processes for the production of polyamides proceed by melt polycondensation. However, due to the very rapid increase in melt viscosity which accompanies a rise in molecular weight, these processes only yield relatively low molecular weight products, as an excessively high melt viscosity gives rise to various problems. Temperature control and removal of the water of reaction accordingly become increasingly difficult, while the long reaction time at the elevated temperatures which are required results in more extensive secondary reactions and gel particle formation, which may dramatically impair the quality of the final product.

Solid phase post-condensation (SPPC) here provides decisive advantages. Due to the generally far lower reaction temperatures (approx. 150 to 230° C., in comparison with 250 to 300° C. in the case of melt condensation), the risk of unwanted secondary reactions and gelation is reduced. Since the material to be subjected to post-condensation comprises defined particles having an interstitial volume, it is not problematic to maintain a uniform reaction temperature and to remove the residual water. However, the achievable molecular weight is limited with SPPC too, as the viscosity values of the products level out to a plateau. While the height of this viscosity plateau may indeed be raised by increasing the temperature, such an increase then in turn gives rise to problems such as secondary reactions and gelation.

Production of large tubes by extrusion or hollow mouldings by extrusion blow moulding or suction blow moulding (for example automotive ventilation tubes or tanks or automotive intake manifolds) require polymer composition with a high melt viscosity and relative high melt stability compared to other processes like injection moulding processes.

A manner to obtain polyamides with higher viscosity at low shear rates is by using polyfunctional compounds, such as tri- and tetrafunctional carboxylic acids or amines, which act as branching agents. Branching is often used in polymers with regular molecular weights, to increase the flowability of the polymers. However, with the increase in the amount of branching agent and increase in viscosity there is also an increased tendency to gel formation. This is why special measures or procedures have to be taken to obtain a branched polymer with the right properties.

Polyamides that exhibit less a problem of gel formation are lactam based polyamides, also known as AB type polyamides. Using only either polyfunctional compounds with amine functional groups, or polyfunctional compounds with carboxylic acid functional groups, results merely in star burst type of polymers with either amine end groups, or alternatively carboxylic end groups, with a single branching point. To achieve a higher branching degree, often chain extenders, such as difunctional amines or dicarboxylic acids, are used, in combination with chain stoppers, such mono functional amines or monocarboxylic acids. The components have to be balanced properly to achieve a high viscosity with a high degree of branching and no crosslinking of gelation.

U.S. Pat. No. 6,566,486B1 describes a process for the production of branched polyamides, aimed to exhibit very high melt strength at low shear rates, as are required, for example, for extrusion blow moulding. In the process of U.S. Pat. No. 6,566,486B1 trifunctional amines containing a secondary amino group are incorporated in caprolactam copolymers or other low melting polyamide in quantities of 0.1-1 wt. %. The process of U.S. Pat. No. 6,566,486B1 is a two stage process, comprising a melt polymerization step and a solid state post condensation step applied to the same material. In between the melt polymerization step and the solid state post condensation step the material is subjected to aqueous extraction to remove low molecular weight constituents. The viscosities after the first and second step are said to be very important in order to achieve the best results. After the first step, the melt viscosity measured at 270° C. and at a shear rate of $10\,s^{-1}$, has to be between 120 and 1500 Pas, and preferably is between 200 and 1000 Pas, and after the second step, its is between 1000 and 8000 Pas. The products of U.S. Pat. No. 6,566,486B1 are claimed to be initially free flowing and gel particle free, as these polymers are low in content in branching agent and largely unbranched. However, upon extended processing times at melt processing temperatures also these polymers tend to crosslink.

In U.S. Pat. No. 4,963,646 two unbalanced prepolymers of low viscosity, one containing excess COOH end groups, and the other containing excess NH2 end groups, are mixed in given proportions, and then, in a second stage, post-condensation is carried out in a molten state. The prepolymers may comprise branching agents. The copolyamides thus prepared are amorphous and transparent and have viscosities suitable for injection moulding.

Polyamides used for automotive applications such as ventilation tubes or automotive intake manifolds have to withstand high temperatures and are often made from semi-crystalline polyamides, which are generally of AA-BB type polyamides, such as the semi-crystalline aliphatic polyamides PA46 and PA66, and semi-crystalline semi-aromatic polyamides based on terephthalic acid. With AA-BB type polyamides it is generally even more difficult to obtain to achieve a high viscosity with a high degree of branching and no crosslinking of gelation. The branching can also disturb the crystallinity of the polyamide, resulting in a decrease in its properties.

Generally, the preparation of branched AA-BB type polyamides, requires the selection of mixtures of monomer and/or prepolymers or mixtures of branching agents and linear polymers, with an off-balance in end groups and/or a compensation with chain stoppers to prevent gelation, or a critically controlled process to stop the polymerization prior to such gelation.

Known processes for the production of high viscosity polyamides are solid phase post-condensation of medium viscosity linear polyamides and the incorporation of branching agents into the polymer chains. The latter may be performed during polycondensation in a batch process or in a continuous tubular reactor. The incorporation of branching agents, which are introduced with monomers in the polycondensation reaction, normally gives rise to non-homogeneous products with a strong tendency towards forming gel particles and specks.

U.S. Pat. No. 5,760,163 describes branched polymers aimed to combine high stiffness with an improved flow. The branched polyamides described herein are prepared by melt mixing (a) a polyamide prepolymer having a viscosity number of from 40 to 90 ml/g with (b) a polybasic carboxylic acid having 3-10 free carboxylic acid groups (e.g. trimesic acid) and (c) optionally further additives and processing aids, and subsequently further post condensing the mixture in the solid state (SSPC). Stated advantages of this process are readily controllable molecular weight, good flowability and overall crystallinity while avoiding formation of gel particles and crosslinking. However, prior to the SSPC step, the product obtained from the melt mixing steps, after being cooled and granulated, was extracted in water for 8 hours so as to remove unreacted polybasic carboxylic acid. This makes the process not only extra tedious but also difficult to control in a repeatable manner.

EP1778763B1 describes a process for the preparation of highly branched polyamides, comprising reacting a mixture if two-functional monomer (A2) and three-functional monomer (B3), either A or B is an amine and the other of A and B is a carboxylic acid. In particular a two-step process is applied wherein in particular during second step the viscosity is monitored in order to stop the reaction once the viscosity starts to sharply increase. The molecular weights attainable with said process are generally rather low (Mn 1600-7400; Mw 2150-13100).

Branched AA-BB type polyamides, and methods for making the same, are also described in US2009264588/ WO07113262, WO2009/040436-A1, US20090264588 and WO2010/142605. A and B functions are functions that may react together to form an amide bond.

The branched polyamide described in US2009264588/ WO07113262 is prepared from a blend of two-functional (AA and BB) monomers, together with a mixture of polyfunctional components and monofunctional components. Monofunctional components need to be used as chain stopper to prevent the risk of crosslinking and gel formation. Such a process makes it difficult to make polymers with sufficiently high Mw needed for suction blow moulding.

The branched polyamides described in WO2009/040436-A1 are obtained from dicarboxylic acid and diamine monomers in the presence of multifunctional and optionally monofunctional compounds by a one pot synthesis. The polyamides are aimed for good fluidity, mechanical properties and surface properties. To get acceptable products, the polyamides are required to have either a large excess of one type of end-groups, i.e. the absolute value for the difference between mono end groups and carboxylic end groups needs to be large, or a large amount of monofunctional compounds, which act as chain stopper.

US20090264588 describes modified polyamides claimed to have enhanced flowability and mechanical properties. These polyamides are obtained from dicarboxylic acids and diamine monomers, or salts thereof, 0.05 to 0.5 mole % of polyfunctional compounds and 0.2 to 2 mol % of monofunctional compounds, in which the functional groups of both the polyfunctional compounds and the monofunctional compounds are carboxylic acid groups or both are amino groups. Such polymers generally have relative low intrinsic viscosities.

WO2010/142605 relates to high viscosity polyamides, more particularly with an intrinsic viscosity (IV) between 150 and 300 mL/g, according to ISO 307, obtained by polymerization of monomers dicarboxylic acids and diamines in the presence of multifunctional compounds comprising at least 3 functions A or B, and optionally monofunctional compounds. This polyamide is said to be particularly useful for the manufacture of compositions for example, to be moulded or blown. The polyamide is said to be prepared in a one step synthesis, in an autoclave at elevated pressure, without occurrence of gel-formation. However, in order to achieve that the polyamide obtained must have an excess of one type of terminal groups of at least 30, more particularly between 30 and 150. It has been observed that in such a process the viscosity of the polymer is very hard to control.

The existing processes described above are either very critical in the process steps to be followed and/or in the balance of amine and carboxylic groups which complicates obtaining high viscosities and if achievable not to be faced with gel formation.

The aim of the present invention is to provide a high molecular weight branched polyamide that can be used in suction blow moulding, and a process for its production that does not have the above problems or in less extent.

This aim has been achieved with the process according to the invention. The process according to the invention is an at least two-stage process, comprising a melt-mixing step and a solid state post-condensation step. The process according to the invention comprises (1) a melt-mixing step wherein
an essentially linear polyamide (pre)polymer (X), predominantly consisting of AA-BB repeat units, and
a branched polyamide prepolymer (Y), predominantly consisting of AA-BB repeat units and branching units,
and optionally other components (Z)
are provided to and mixed and heated in a melt mixing apparatus, thereby forming a mixed melt, and the mixed melt being cooled, thereby forming a solid mixture;

and (2) a solid state post condensation step wherein the solid mixture is post-condensed at elevated temperature in the solid state, thereby forming a high molecular weight branched polyamide polymer.

The effect of the process according to the present invention is that a homogeneous mixture is obtained rather easily, a branched polyamide with a high viscosity is obtained in a controllable manner in a wide range of compositions without gel formation even when end-group functionalities are not off-balance and/or not blocked with chain stoppers, and no unreacted branching agent has to be extracted.

The term prepolymer is herein understood to be either an oligomer or a polymer. An oligomer generally consists of a limited number of repeat units and typically has a rather low molecular weight, and is typically characterised by a very low viscosity in the melt. A prepolymer may have a higher molecular weight, but the molecular weight of a prepolymer is typically still too low for moulding applications and similar purpose. A prepolymer generally has a rather low viscosity in the melt.

The term (pre)polymer is herein understood to be either a prepolymer or a polymer. A prepolymer is characterised by a relative low viscosity in the melt and relative low molecular weight, whereas a polymer can have a medium to high molecular weight and corresponding medium to high viscosity in the melt.

Although the essentially linear polyamide (pre)polymer (X) and the branched polyamide prepolymer (Y) may each be off-balance in end groups, e.g. excess in amine functional end groups (AFE) or excess in carboxylic functional end groups (CFE), the process is readily performed with each of the linear polyamide (pre)polymer (X) and the branched polyamide prepolymer (Y) being in balance in end groups, or nearly so, i.e. each having more or less equal number of carboxylic functional end groups (CFE) and number of amine functional end groups (AFE). This not only allows for a faster post condensation process, but also allows a wider variation in mixing ratio between (X) and (Y) without the need to adapt the composition of each of them, and also results in reaching a high viscosity in a relative short time.

In stead of end group also the term terminal group is used. The amounts of amino terminal groups and/or acids are determined by potentiometric titration after dissolution of the polyamide. A method is described for example in "Encyclopaedia of Industrial Chemical Analysis", volume 17, page 293, 1973.

The essentially linear polyamide (pre)polymer (X), consisting predominantly of AA and BB repeat units, and the branched polyamide prepolymer (Y), consisting predominantly of AA and BB repeat units and branching units, may comprise repeat units derived from other components. However, the content of such other units is generally less than 40 mole %, relative to the total molar amount of AA and BB repeat units, respectively to the total molar amount of AA and BB repeat units and branching units.

In a preferred embodiment of the present invention, the branched polyamide prepolymer (Y) is a branched polyamide prepolymer obtained or obtainable by polymerization of a polyamide forming monomer mixture, comprising repeat units derived from a monomer mixture comprising (A) a first monomer (referred to as monomer A) having two amino functional groups, and (B) a second monomer (referred to as monomer B) having two carboxylic acid functional groups or precursor groups thereof;

and/or a salt of A and B, and (C) a third monomer (referred to as monomer C) having at least three functional groups being either amino groups and/or carboxylic acid functional groups or precursor groups thereof, wherein the repeat units are present in a molar amount according to formula I and formula II:

$$Q=(MC*FC)/(MA+MB) \quad \text{(Formula I)}$$

and $$R=((MA*2)+(MC*FCA))/((MB*2)+(MC*FCB)) \quad \text{(Formula II)}$$

wherein

MA, MB and MC represent the molar amounts of repeat units derived from the monomers A, B and C, respectively;

FC represent the functionality of monomer C, and is equal to FC-A+FC-B;

FC-A is the number of the amino functional groups comprised by monomer C;

FC-B is the number of carboxyl functional groups or precursor groups thereof comprised by monomer C;

Q is a number in the range of 0.06-1.00; and

R is a number in the range of 0.7-1.3;

and wherein the branched polyamide prepolymer has a viscosity number (VN), measured according to ISO 307, in the range of 7-30 mL/g.

The advantages of the branched polyamide prepolymer (Y) according to the present invention are in the process for the preparation of the polymer: the melting point of the precursor is higher and volatility is lower than the starting monomer C. Thus a solid material can be added during extrusion, which does not provide problems of stickiness or flashing off. The prepolymer can added more controlled and can simply be blended with other (pre)polymers for making high Mw branched polyamides with reduced risk of gel formation and without the need to correct the end group balance or to correct with monofunctional monomers.

Preferably, the number Q is in the range of 0.10-0.75; more preferably 0.15-0.60. A low value for Q might be used but results in longer post condensation times in second step to reach high a high Mw for the target branched polyamide polymer. A high value for Q may be used, but makes the process more critical in respect of gel formation. The optimum is to have a number Q with a value in the range of better 0.24-0.45.

The branched polyamide prepolymer (Y) according to the invention is prepared from a monomer mixture such that the amount of co-reacting groups, i.e. amino groups and carboxylic acid groups or precursors thereof, is in-balance or not far off-balance. Though one type of group can be in excess of the other, the excess is limited by the boundary levels set for R.

The ratio between amine functional groups and carboxyl functional groups, or precursors thereof, as represented by R in formula II, may be such that there is an excess of carboxyl functional groups or amine functional groups. Preferably this excess is limited, such that R is in the range of 0.8-1.25, better 0.9-1.2. This allows the prepolymer to be prepared with a higher molecular weight. Most preferably, the ratio R is in the range of 0.95-1.1, i.e. the end groups are bout in balance or there is a small excess of amine groups. This has the advantage that the acid and amine functionalities are more in balance to increase molecular weight in the next process step.

The branched polyamide prepolymer (Y) according the preferred embodiment described above has a viscosity number (VN), measured according to ISO 307, in the range of 7-30 mL/g. Suitably, the VN of the prepolymer is in the range of 10-25 mL/g, or even better 13-18 mL/g. A higher VN has the advantage that the prepolymer has a higher melting point, a lower VN has the advantage that the prepolymer can comprise more branching agent.

The viscosity number (VN) according to ISO 307 as mentioned herein for the branched prepolymer (Y) is measured on a polymer solution of polyamide at a concentration of 5 gram of polymer in 100 ml of either sulphuric acid 96.00±0.15% m/m or formic acid 90.00±0.05% at 25.00±0.05° C. Formic acid is used for fully aliphatic polyamides. Sulphuric acid is used for polyamides comprising aromatic groups.

The branched polyamide prepolymer (Y) according to the invention can have a number average molecular weight (Mn) varying over a wide range, as long as the VN stays with the indicated range. Suitably, the Mn of the prepolymer is in the range of 600-3500 g/mol, for example in the range 800-3000, or more particularly 1000-2000 g/mol.

The number average molecular weight (Mn) referred to herein is determined by size-exclusion chromatography (SEC) combined with different detectors. The SEC-system consisted of three PFG Linear XL columns (300 mm×8 mm ID) supplied by Polymer Standards Service, operating at 0.4 ml/min and thermostatted at 35° C. For the measurements a refractive index detector (RI), a viscometer and a right-angle laser-light scattering detector was used and molar masses were calculated using these triple detector signals to yield molar-masses. The injection volume was 75 μl. Hexafluoroisopropanol with 0.1% (w/w) potassium trifluoro acetate was used as eluent. All samples were filtered over a 0.1 μm filter before injection.

In order to prevent crosslinking in the prepolymer, which is relatively high in content in crosslinking agent, the polymerization of the prepolymer is stopped far before completion of the polyamide formation reaction. As a result the prepolymer is generally characterized by the presence of both amino functional end groups and carboxylic acid functional end groups, i.e. amino functional end groups and carboxylic acid functional end groups and are present next to each other.

Preferably the branched polyamide prepolymer (Y) has carboxylic acid functional end groups and amino functional end groups, wherein the ratio (REG) between the number of the amino functional end groups (NEG-A) and the number of carboxyl functional end groups (NEG-B) in the prepolymer is in the range of 0.5-2.0. Preferably REG is in the range of 0.7-1.6 (preferably 0.8-1.4, or even better 0.9-1.2. I.e. there is a preference for a balanced ratio or a slight excess of amines, for faster build up of molar mass in the next step of the polymerization process.

Monomer A used for the branched polyamide prepolymer (Y) is a diamine. Monomer A can be any diamine that is suitable for making polyamides. The monomer A can be, for example, an aliphatic diamine, linear or branched, a cyclo-aliphatic diamine, an aromatic diamine or any mixture thereof. The aliphatic diamine may also be an aliphatic aromatic diamine, such as m-xylylene diamine. Preferably, the diamine is an aliphatic diamine, which may be linear or branched, more preferably having 4-12 C atoms. Examples of suitable aliphatic diamines are 1,4-diaminobutane (or butanediamine), 1,6-diaminohexane (or hexamethylenediamine), methylpentamethylenediamine, 1,8-diaminooctane, 3,3',5-trimethyl hexamethylenediamine, 1,8-,2-methyloctanediamine, 1,9-nonadiamine, 1,10-diaminodecane, 1,12-diaminododecane. Examples of suitable cyclo-aliphatic diamine is 1,4 cyclohexane diamine and isophorone diamine.

Monomer B used for the branched polyamide prepolymer (Y) can be any dicarboxylic acid, or precursor thereof, that is suitable for making polyamide. Esters like alkyl ester and acid chloride derivatives of carboxylic acids are suitable precursors of carboxylic acids as these can react with amines to form amide groups. Generally, such dicarboxylic acids will include saturated aliphatic dicarboxylic acids and aromatic dicarboxylic acids, although unsaturated dicarboxylic acids may also be used. Examples of suitable saturated aliphatic dicarboxylic acids ethanedioic acid, pentanedioic acid, hexanedioic acid, heptanedioic acid, octanedioic acid, nonanediocic acid, decanedioic acid, undecanedioic acid, dodecanedioic acid etc. Aromatic dicarboxylic acids that can be used, are, for example, isophthalic acid and terephthalic acid. Examples of unsaturated dicarboxylic acids are pent-2-enedioic acid and dodec-2-enedioic acid. As dicarboxylic acid monomer can be mentioned in particular aliphatic or aromatic carboxylic diacids having 4 to 12 carbon atoms, such as adipic acid, terephthalic acid, isophthalic acid, pimelic acid, suberic acid, decanedioic acid, dodecanedioic acid. Preferably, monomer B is a dicarboxylic acid chosen from adipic acid, terephthalic acid and isophthalic acid, or an ester or acid chloride derivative thereof, and any mixture thereof.

The diamine monomers (A) and dicarboxylic acid monomers (B) may be used in any combination. These include those conventionally used for manufacturing the following polyamides, but not limited thereto: aliphatic-type polyamides such as PA 6.6, PA 6.10, PA 6.12, PA 12.12, PA 4.6, and semi-aromatic polyamides including poly-m-xylylenediamine adipate (PA-MXD6), polyterephthalamides, such as PA 6.T, PA 9.T and PA6.6/6T, and polyisophthalamides, such as PA66/6I, or their copolymers. The monomers may be optionally combined in the form of salts of dicarboxylic acids and diamine monomers.

For the monomer C to be used as branching agent in the branched polyamide prepolymer (Y) according to the invention, in principle any compound having three or more functional groups that can react with other groups thereby forming amide groups can be used. The functional groups can be either amine groups, or carboxylic acid functional groups or precursor groups thereof, or a combination thereof. Thus monomer C should have at least three amine groups, or at least three carboxylic acid functional groups or precursor groups thereof, or at least one amine group and at least two carboxylic acid functional groups or precursor groups thereof, or at least two amine groups and at least one carboxylic acid functional group or precursor group thereof. Suitably, monomer C is a compound with three or more amino functional groups or a compound with three or more carboxylic acid functional groups.

Preferably, monomer C is a three functional compound with identical functional groups, i.e. a tris-amino functional compounds or a three functional carboxylic acid compound or precursor thereof.

The multifunctional compound may include a core part bearing the functional groups, which corer part can be in particular cyclohexyl, cyclohexanoyl, benzyl, naphthyl, anthracenyl, biphenyl, a triphenyl pyridine, bipyridine, pyrrole, indole, furan, a thiophene, a purine, quinoline, a phenanthrene, a porphyrin, a phthalocyanine, a naphthalocyanine, a 1,3,5-triazine, a 1,4-diazine, a 2,3,5,6-tetraethylpiperazine, a piperazine, and/or tetrathiafulvalene.

Examples of suitable multifunctional compounds bearing four carboxylic acid functions, include 2,2,6,6-tetra-(beta-carboxyethyl)cyclohexanone, diaminopropane-N,N,N',N'-tetraacetic acid, 3,5,3',5'-biphenyltetracarboxylic acid, 3,5,3',5'-biphenyltetracarboxylic acid, 1,3,5,7-naphthalenetetracarboxylic acid, 3,5,3',5'-bipyridyltetracarboxylique acid, 1,3,6,8-achdinetetracarboxylique acid, and 1,2,4,5-benzenetetracarboxylic acid. Examples of suitable three functional carboxylic acid compounds or precursor thereof are 2,4,6-pyridinetricarboxylique acid and trimesic acid (benzene-1,3,5-tricarboxylic acid).

As examples of multifunctional compounds bearing amine functions can be mentioned melamine; tris(aminoalkyl) amines, such as tris(aminoethyl)amine (TAEA); polyalkylenetriamines, such as for example Jeffamine T (R) Huntsman, including Jeffamine T403 (R) (polyoxypropylenetriamine); and dialkylenetriamines, such as diethylenetriamine (DETA) bis(hexamethyene)triamine (BHT), and 4-aminomethyl-1,8-octanediamine. Examples of suitable tris-amino functional compounds are bis(hexamethyene)triamine (BHT), diethylenetriamine and combinations thereof.

Particularly preferably the tris-amino functional compounds comprises bis(hexamethyene)triamine (BHT) and/or diethylenetriamine (DETA), more preferably bis(hexamethyene)triamine (BHT).

Preferably, the branched polyamide prepolymer (Y) and the branched polyamide polymer of the invention based thereupon is obtained by polymerization of monomers dicarboxylic acids and diamines or their salts, and a single type of multifunctional compounds (C).

Preferably, monomer C comprises or even consists of a polyamino functional compound, more preferably a tris-amino functional compound.

The branched polyamide prepolymer (Y) according to the invention may comprise repeat units derived from monomers other than monomers A, B and C in an amount of at most 40 mol %, relative to the total molar amount of A, B and C (i.e. MA+MB+MC).

Preferably the amount of monomers other than monomers A, B and C is at most 20 mol %, even better at most 10 mol %, and still better in the range of 0-5 mol %, if used at all. Such other monomers can be, for example, αω-amino acids, or their cyclic lactam derivatives thereof, (together also denoted as AB monomers, and resulting in AB repeat units), and monofunctional compounds, such as monofunctional amines or monofunctional carboxylic acids. A suitable lactam derivative is, for example, caprolactam. If one would use large amount of other monomers such as lactams, in combination with monomer C, and less diamines (monomer A) and dicarboxylic acids (monomer B), which result in AA-BB repeat units, it becomes more difficult to get a branched polymer with shows sufficient shear thinning. However, in particular the amount of monofunctional compounds, which can act as chain stopper, shall be limited and preferably is at most 5 mol %.

Suitable compositions for the branched polyamide prepolymer (Y) according to the invention, are for example, but mot limited thereto, prepolymers comprises 25-50 mole % 1,4-diaminobutane, 40-60 mole % adipic acid, and 2.5-25 mole % bis(hexamethyene)triamine (BHT) and has an Mn, measured by SEC, in the range of 600-3500 g/mol.

In this example the amount of 1,4-diaminobutane may well be chosen in a more narrow range, for example 30-49 mole %, or even 35-45 mole %. Likewise, the amount of adipic acid may be chosen in a more narrow range, for example 45-55 mole %, or even 49-41 mole %. Also the amount of bis (hexamethyene)triamine (BHT) well be chosen in a more narrow range, for example 4-20 mole %, or even 5-15 mole %.

Other suitable compositions for the branched polyamide prepolymer (Y) according to the invention, are for example, but not limited thereto, prepolymers comprising 25-50 mole % adipic acid, 40-60 mole % 1,4-diaminobutane, and 2.5-25 mole % three functional carboxylic acid compound, for example trimesic acid, and has an Mn, measured by SEC, in the range of 600-3500 g/mol.

Also in this example, the amount of adipic acid may well be chosen in a more narrow range, for example 30-49 mole %, or even 35-45 mole %. Likewise, the amount of 1,4-diaminobutane may be chosen in a more narrow range, for example 45-55 mole %, or even 49-41 mole %. Also the amount of the three functional carboxylic acid compound may well be chosen in a more narrow range, for example 4-20 mole %, or even 5-15 mole %.

In these examples 1,4-diaminobutane may be replaced by other diamines, or by mixtures of diamines, e.g. mixtures of 1,4-diaminobutane with other diamines. Analogously, adipic acid may be replaced by other dicarboxylic acids, or by mixtures of dicarboxylic acids, e.g. mixtures of adipic acid with other dicarboxylic acids. Also bis(hexamethyene)triamine (BHT) respectively trimesic may be replaced by or combined with other polyfunctional diamines, respectively polyfunctional carboxylic acid compounds.

The present invention also relates to a process for preparing the above described branched polyamide prepolymer (Y), and the various embodiments and examples thereof. The process according to the invention for preparing the branched polyamide prepolymer comprises the steps of:

(I) preparing a monomer mixture comprising
  (A) a first monomer (referred to as monomer A) having two amino functional groups, and
  (B) a second monomer (referred to as monomer B) having two carboxyl acid functional groups or precursor groups thereof,
  and/or a salt of A and B, and
  (C) a third monomer (referred to as monomer C) having at least three functional groups, being either amino groups and/or carboxylic acid functional groups or precursor groups thereof,
wherein
  1. the functional groups of monomer A and monomer B can react with each other to form amide groups, and the functional groups of monomer C can react with either the functional groups of monomer A and/or the functional groups of monomer B to form amide groups,
  2. the monomers are present in molar amounts according to formula I and II:

$$Q=(MC*FC)/(MA+MB) \quad \text{(Formula I)}$$

and $$R=((MA*2)+(MC*FCA))/((MB*2)+(MC*FCB)) \quad \text{(Formula II)}$$

wherein
  MA, MB and MC represent the molar amounts of repeat units derived from the monomers A, B and C, respectively;
  FC represent the functionality of monomer C, and is equal to FC-A+FC-B;
  FC-A is the number of the amino functional groups comprised by monomer C;
  FC-B is the number of carboxyl functional groups or precursor groups thereof comprised by monomer C;
  Q is a number in the range of 0.06-1.00; and
  R is a number in the range of 0.7-1.3;
(II) heating the monomer mixture thereby inducing a reaction between the monomers resulting in polymerization of the monomers through amide formation;

(III) keeping the monomer mixture at elevated temperature until a polyamide prepolymer having a viscosity number (VN), measured according to ISO 307, in the range of 7-30 mL/g is obtained; and (IV) cooling the prepolymer.

The viscosity number (VN) mentioned herein is measured as described further above. Herein, the AA-repeat units are repeat units derivable from a monomer having two amino functional groups, and BB-repeat units are repeat units derivable from a monomer having two carboxylic acid functional groups or precursor groups thereof.

The advantages of this process reside in the branched polyamide prepolymer so prepared and the use thereof in the process to prepare a high Mw branched polyamide, which advantages have already been described above.

The specific and preferred embodiments of the above process according to the invention for preparing the branched polyamide prepolymer are directly related to the specific and preferred embodiments of the branched polyamide prepolymer (Y) described above. The process can be modified accordingly.

The polymerization process for preparing the prepolymer (Y) can be executed by employing conventional operating conditions of polymerization of dicarboxylic acids and diamines, as when it is performed for the preparation of prepolymers in the absence of multifunctional compounds. Such a polymerization process can comprise briefly: a stirring and heating under pressure of the mixture of monomers and multifunctional compounds, maintaining the mixture under pressure and temperature for a fixed period, with removal of water vapour by an appropriate device. This can be followed by release of the reactor content by flashing, thereby removing the remaining water and cooling the prepolymer. Thus the prepolymer can be obtained in solid powder form.

It is perfectly possible to add at the beginning, during or after the polymerization additives, such as for example catalysts, such as phosphorus catalysts, anti-foaming agents and stabilizers to light or heat. During the removal of water vapour some diamine may be removed as well. It might therefore be advantageous to add some excess diamine at the beginning of the polymerization, or to supplement some extra diamine during the polymerization, in order to achieve the prepolymer with the desired composition.

The essentially linear polyamide (pre)polymer (X), also referred to as linear (pre)polymer (X), or in abbreviated form as (X) used in the polymerization process according to the invention for making the high molecular weight branched polyamide polymer, predominantly consists of AA-BB repeat units. In other words the linear (pre)polymer (X) is a polyamide (pre)polymer obtainable by polymerization of a polyamide forming monomer mixture comprising predominantly (A) a first monomer (referred to as monomer A) having two amino functional groups, and (B) a second monomer (referred to as monomer B) having two carboxylic acid functional groups or precursor groups thereof, and/or a salt of A and B.

As for the branched prepolymer (Y) described further above, precursor groups of carboxylic acid functional groups are functional groups that, like carboxylic acid functional groups, can react with an amine functional group to form an amide bond.

The monomers A and monomers B, and preferred selections thereof that can be used for the linear (pre) polymer (X) are the same as described further above for the branched prepolymer (Y). Suitably, the essentially linear polyamide (pre)polymer (X) consists of repeat units derived from dicarboxylic acids chosen from adipic acid, terephthalic acid and isophthalic acid, and any mixture thereof and a C2-C12 aliphatic diamine.

The essentially linear polyamide (pre)polymer (X) may comprise units derived from other monomers than the monomers A and monomers B. The amount thereof is at most 40 mol %, relative to the total molar amount of monomers A and B. If one would use large amount of other monomers such as lactams, and less AA-BB repeat units, it becomes more difficult to get shear thinning, and the product would also have less good thermal properties.

Preferably the amount is at most 20 mol %, even better at most 10 mol %, and still better in the range of 0-5 mol %, if used at all. Such other monomers can be, for example, $\alpha\omega$-amino acids, or their cyclic lactam derivatives thereof (AB monomers), and monofunctional compounds, such as monofunctional amines or monofunctional carboxylic acids. A suitable lactam derivative is for example, caprolactam. In particular the amount of monofunctional compounds, which can act as chain stopper, shall be limited and is preferably at most 0.5 mol % if any, and preferably 0-0.25 mol %.

The essentially linear polyamide (pre)polymer (X) used in the process according to the invention may also comprise small amounts of branching units, for example as a result of side reactions during the preparation of the prepolymer; however, the amount of such branching units should preferably be kept below 1 mole %, more preferably below 0.5 mole % if any, and most preferably is in the range of 0-0.25 mole %, relative to the total molar amount of monomer A and monomer B (i.e. MA+MB).

The (pre)polymer (X) can have a viscosity varying over a wide range. Suitably, (pre)polymer (X) has a viscosity number (VN), measured according to ISO 307, of at least 50 mL/g and up to 250 mL/g. Preferred is that the VN of (pre)polymer (X) is at least 75, even better at least 150 mL/g.

The viscosity number (VN) according to ISO 307 as mentioned herein for the linear (pre)popolymers (X) is measured on a polymer solution of polyamide at a concentration of 0.5 gram of polymer in 100 ml of either sulphuric acid 96.00±0.15% m/m or formic acid 90.00±0.05% at 25.00±0.05° C.

The (pre)polymer (X) can also have a molecular weight varying over a wide range. Suitably, (pre)polymer (X) has a number average molecular weight (Mn) (measured by SEC) in the range of 2.000-40.000 g/mol. Preferred is that the Mn of (pre)polymer (X) is at least 5,000 g/mol, even better at least 10,000 g/mol. Still more preferably the Mn of (pre)polymer (X) is in the range of 10,000-30,000 g/mol. Herein the Mn is measured in the same way, under the same conditions, as described above for prepolymer (Y).

The (pre)polymer (X) is a thermoplastic materials and suitably is a semi-crystalline polyamide having a melting temperature. The melting temperature of (pre)polymer (X) will herein be denoted as TmX.

With the term melting temperature is herein understood the temperature, measured according to ASTM D3417-97/D3418-97 by DSC with a heating rate and cooling rate of 10° C./min, measured in the second heating cycle falling in the melting range and showing the highest melting rate.

Suitably, TmX is at least 240° C., preferably at least 260° C., and more preferably at least 280° C. For the higher melting (pre)polymers suitably polyamides such as like PA-46, PA6T/66, PA-9T and alike are used.

For the polymerization process for preparing the (pre)polymer (X) conventional operating conditions of polymerization of dicarboxylic acids and diamines can be applied. Such a polymerization process can comprise briefly: a stirring and heating under pressure of the mixture of monomers in a suitable reaction vessel, such as a pressure reactor or autoclave, maintaining the mixture under pressure and temperature for a fixed period, with removal of water vapour by an appropriate device, decompression and maintenance for a fixed period at a temperature above the melting point of the mixture, including autogenous pressure of water vapour in nitrogen or vacuum, so to continue the polymerization by removal of water formed. It is perfectly possible to add at the beginning, during or after polymerization of conventional additives, such as for example catalysts, such as phosphorus catalysts, anti-foaming agents and stabilizers to light or heat. After the polymerization, the polymer can advantageously be extruded, cooled with water, and then cut to produce pellets. Alternatively, the process can also be performed with a flash step as described above. The polymerization process can be fully realized in a continuous or discontinuous.

The (pre)polymers (X) is a thermoplastic material, and suitably is a semi-crystalline polyamide having a melting temperature, which is denoted herein as TmX.

Suitably, TmX is at least 240° C., preferably at least 260° C., and more preferably at least 280° C. For the higher melting (pre)polymers suitably polyamides such as like PA-46, PA6T/66, PA-9T and alike are used.

In a preferred embodiment of the process according to the present invention for preparing a high molecular weight branched polyamide polymer, comprising the melt-mixing step (1) and the solid state post condensation step (2) as described above, for the branched polyamide prepolymer (Y) a branched polymer according to the present invention as described above is used.

The effect of the process according to the invention is that branched polyamide polymer is obtained without the occurrence of gel formation and has a high and relatively stable melt viscosity. The ratio between the essentially linear polyamide (pre)polymer (X), and the branched polyamide prepolymer (Y) can be varied over a wide range thereby varying the degree of branching of the polymer, without having hardly any effect on the occurrence of gel particles and the stability of the viscosity even upon longer processing times at melt processing temperatures.

In the process according to the invention, the branched prepolymer (Y) is melt mixed together with the essentially linear polyamide (X), and may optionally be compounded at the same time with one or more other ingredients or components (Z). Suitably, this melt-mixing and compounding is done in an extruder, or any other appropriate melt-mixing apparatus. After the melt mixing, the mixed melt so obtained is cooled. Suitably the mixed melt is first extruded into strands, upon which the strands can be cooled cut into granules. The granules can be subjected to solid state post condensation in order to achieve the desired high molar mass/melt viscosity. The melt-mixing, cooling and granulation may also be done otherwise, for example by film extrusion and grinding of the film, thereby obtaining the solid mixture of prepolymers optionally compounded with other ingredients or components in a suitable form for performing the solid state post condensation. The solid state post condensation can be performed by standard procedures known to the person skilled in the art.

The essentially linear (pre)polymer (X) and the branched prepolymer (Y) may be mixed in a ratio varying over a wide range. Suitably the mixture comprises 75-99 wt. % (X) and 1-25 wt. % (Y), wherein the wt. % are relative to the total weight of (X) and (Y).

Most conveniently, the amount of branching agent in (Y) is chosen such that the (X) and (Y) are mixed ratio wherein (X) is present in an amount in the range of 90-98 wt. % and (Y) is present in an amount in the range of 2-10 wt. %, relative to the total weight of (X) and (Y).

Preferably, (X) and (Y) are mixed in such a ratio that the amount of repeat units derived from the branching monomer (C) in the prepolymer mix, as well as in the ultimately formed branched polyamide polymer, is in the range of 0.05-1 mole %, more preferably 0.1-0.65 mole %, still more preferable 0.2-0.5 mole %, relative to the total molar amount of repeat units in the prepolymer mix, respectively in the branched polyamide polymer. This total amount of repeat units encompasses all repeat units derived from all constituent monomers, i.e. A and B and C monomers and optionally AB monomers in any and all of the prepolymers. A higher amount of branching units results in a polyamide polymer with more shear thinning character. A lower amount of branching units has the advantage that the polyamide polymer can be post condensed to even higher molecular weights without the risk of gel formation.

The essentially linear (pre)polymer (X) can be a blend of different AA-BB (pre)polymers. Also the branched prepolymer (Y) can be a blend of different branched polyamide prepolymers.

Other components that can be included in the polymerization process and can be comprised by the resulting polyamide polymer, are, for example, fillers and fibrous reinforcing agents. To improve the mechanical properties of the composition, it may be advantageous to add at least a filler and/or fibrous reinforcing agent. Such material may well be selected from the group consisting of fibrous such as glass fibres, mineral fillers such as clays, kaolin, and nanoparticles, and powder fillers such as talc. The incorporation rate of a filler and/or fibrous reinforcing agent can be for example a loading rate of 1 to 80 percent, preferably from 10 to 70 percent, especially between 30 and 60 percent.

The composition of the invention may further comprise additives commonly used in the manufacture of polyamide compositions intended to be moulded. Such additives include, flame retardants, plasticizers, nucleating agents, catalysts, impact modifiers, stabilizers, such as light stabilizers, heat stabilizers and antioxidants, and processing aids, such as lubricants and demoulding agents.

These fillers and additives may be added to the polyamide after the completion of the polymerization, but preferably to the mixed melt, so prior the solid state post condensation.

The other components (Z), if present at all, may be present in an amount varying over a large range. Suitably the mixture comprises 0-200 parts by weight (pbw) of other components (Z), relative to 100 pbw of polyamide prepolymer. For example, impact modifiers are suitably used in an amount of 0-10 wt %, preferably 1-5 wt. %, if used at all. Heat stabilizers In a specific embodiment of the polymerization process according to the invention, the components are mixed in the following ratio (A) 75-99 wt. % of essentially linear polyamide (pre)polymer (X) and (B) 1-25 wt. % of branched polyamide prepolymer (Y), wherein the wt. % is relative to the total weight of (X) and (Y), and (C) 0-200 pbw (parts by weight) of other components Z, relative to 100 pbw of the combined weight of polyamide prepolymers (X) and (Y).

The high molecular weight branched polyamide polymer obtained in the process according to the invention after the solid state post condensation suitably has a relative viscosity (RV) measured according to ISO 307 of at least 2.5. Preferred is that the RV is in the range of –3.5-4.2. The advantage is that the resulting polymer has sufficient melt strength for use in suction blow moulding.

The relative viscosity (RV) according to ISO 307, mentioned herein is determined on a solution of polyamide at a concentration of 1 gram of polymer in 100 ml of either sulphuric acid 96.00±0.15% m/m or formic acid 90.00±0.05% at 25.00±0.05° C., and calculated by the Huggins method. Formic acid is used for fully aliphatic polyamides. Sulphuric acid is used for polyamides comprising aromatic groups.

The modified branched polyamide according to the invention preferably has a viscosity number (VN) between 150 and 300, according to ISO 307, especially between 160 and 250.

Herein the viscosity number (VN) according to ISO 307 for the high molecular weight branched polymers is measured on a polymer solution of polyamide at a concentration of 0.5 gram of polymer in 100 ml of either sulphuric acid 96.00±0.15% m/m or formic acid 90.00±0.05% at 25.00±0.05° C. Formic acid is used for fully aliphatic polyamides. Sulphuric acid is used for polyamides comprising aromatic groups.

The present invention also relates to a high molecular weight branched polyamide polymer, more particularly the high molecular weight branched polyamide polymer obtained or obtainable by the process, and the preferred embodiments thereof, described above.

The invention also relates to a polymer composition comprising the high molecular weight branched polyamide polymer and at least one other component.

The invention in particular relates to a high molecular weight branched polyamide polymer predominantly consisting of repeat units derived from a monomer mixture comprising:
- (A) AA-repeat units derivable from a first monomer (referred to as monomer A) having two amino functional groups, and
- (B) BB-repeat units derivable from a second monomer (referred to as monomer B) having two carboxylic acid functional groups or precursor groups thereof, and/or a salt of A and B, and
- (C) Branching units derivable from a third monomer (referred to as monomer C) having at least three functional groups being either amino groups and/or carboxylic acid functional groups or precursor groups thereof, wherein
the branching units derivable from monomer C are present in an amount of 0.05-1 mole %, more preferably 0.1-0.65 mole %, still more preferable 0.2-0.5 mole %, relative to the total molar amount of the AA-repeat units, the BB-repeat units and the branching units,
the polyamide polymer has a relative viscosity (RV) according to ISO 307 of at least 2.5, and preferably in the range of 3-5, more preferably 3.5-4.

The branched polyamide polymer suitably has a number of the amino functional end groups (EG-A) in the range of 5-40 meq/kg, a number of carboxyl functional end groups (EG-B) in the range of 5-40 meq/kg and a a difference and a difference between the number of amino functional end groups and the number of carboxyl functional end groups [EG-A–EG-B], expressed in absolute value, in the range of 0-35 meq/kg.

As explained above, the branched polyamide polymer prepared by the process according to the invention can be prepared with a small difference in end-group, i.e. being in balance in end groups, or about so, and still have good blow moulding properties.

In particular, the branched polyamide polymer suitably has a number of the amino functional end groups (EG-A) in the range of 8-30 meq/kg, and even better 10-20 meq/kg), a number of carboxyl functional end groups (EG-B) in the range of 8-30 meq/kg, and even better 10-20 meq/kg) and a difference [EA–EB], expressed in the absolute number, in the range of 0-22 meq/kg, even better 0-10 meq/kg).

The polymer composition according to the invention consists of
- (I) the high molecular weight branched polyamide polymer described above and
and optionally
- (II) other components in an amount of 0-200 pbw of relative to 100 pbw of the high molecular weight branched polyamide polymer.

The invention also relates to use of the branched polyamide polymer according to the invention, as well the composition comprising said polymer, in an extrusion or suction blow moulding process for the production of an extrusion moulded part or a suction blow moulded part, as well as to such an extrusion or suction blow moulding process for the preparation of hollow moulding articles. The said process comprises an extrusion step or a suction blow moulding step wherein a high molecular weight branched polyamide polymer or composition as described here above is melt processed and shaped into the shape of a hollow moulding article.

The invention also relates to all articles produced using this branched polyamide polymer or composition and process and articles made of the branched polyamide polymer, more particular an extrusion moulded part or a suction blow moulded part.

The invention is further illustrated with the following examples and comparative experiments.

Methods

The viscosity number (VN) according to ISO 307 for the branched prepolymers was measured on a polymer solution of polyamide at a concentration of 5 gram of polymer in 100 ml of either sulphuric acid 96.00±0.15% m/m or formic acid 90.00±0.05% at 25.00±0.05° C.

The viscosity number (VN) according to ISO 307 for the linear (pre)polymers and the high molecular weight branched polymers was measured on a polymer solution of polyamide at a concentration of 0.5 gram of polymer in 100 ml of either sulphuric acid 96.00±0.15% m/m or formic acid 90.00±0.05% at 25.00±0.05° C.

The relative viscosity (RV) according to ISO 307 was determined on a solution of polyamide at a concentration of 1 gram of polymer in 100 ml of either sulphuric acid 96.00±0.15% m/m or formic acid 90.00±0.05% at 25.00±0.05° C., and calculated by the Huggins method.

Formic acid is used for fully aliphatic polyamides. Sulphuric acid is used for polyamides comprising aromatic groups.

Materials

For (pre)polymer (X) low Mw PA46 and a low Mw PA4T copolyamide was used.

PREPOLYMER SYNTHESIS—EXAMPLE I

Branched prepolymer were prepared from 1,4-diaminobutane (DAB), adipic acid (AA) and bis(hexamethyene)triamine (BHT) with varying BHT content using the following procedure: In an autoclave, a 70% salt solution of DAB and AA with 0.92 wt % excess DAB with respect to the 4.6 salt is prepared with 3.5 mole % BHT. This salt solution is heated and distilled to 90% salt concentration. The prepolymerization was started at 204° C. in a closed system for one hour and then the reactor contents were flashed to get solid prepolymer.

For the Examples B-D different molar amounts for 1,4-diaminobutane (DAB), adipic acid (AA) and bis(hexamethylene)triamine (BHT) were used. The composition, the corresponding Q and R values and the properties if the prepolymers have been collected in Table 1.

TABLE I

Composition and results for Examples IA-ID

| Examples | DAB (mole %) | AA (mole %) | BHT (mole %) | Q | R | EG-A (meq/kg) | EG-B (meq/kg) | VN (ml/g) |
|---|---|---|---|---|---|---|---|---|
| EX-IA | 45.7 | 49.3 | 5.0 | 0.16 | 1.08 | 1164 | 1050 | 19.1 |
| EX-IB | 38.8 | 51.2 | 10.0 | 0.33 | 1.05 | 1235 | 1215 | 19.5 |
| EX-IC | 27.3 | 54.5 | 18.2 | 0.67 | 1.00 | 1634 | 1634 | 18.7 |
| EX-ID | 17.6 | 57.4 | 25.0 | 1.00 | 0.96 | 1634 | 1692 | 18.7 |
| CE-A | 51.2 | 47.8 | 1.0 | 0.03 | 1.104 | 1160 | 1045 | 15.3 |

The product of Example B had a melting temperature of about 260° C.

POLYMER SYNTHESIS—EXAMPLES E-H AND COMPARATIVE EXPERIMENT I-X

Branched polymers were prepared from the combination of the different linear prepolymers (X) and the branched prepolymers from Example IB using the following procedure:

Compounding

The branched prepolymers obtained as described above were dried at 40° C. for 16 hours under vacuum of 100 mbar. The prepolymers were compounded together with linear polymer, glass fibres and other additives in an extruder to get a homogeneous mixture of all ingredients. The composition of the blends is listed in Table 2.

Post Condensation

The blends obtained in the compounding step B were post condensed at 190° C. to obtain a desirable relative solution viscosity of the compounds. The post condensation was performed in an SS column equipped with a heating mantle and inlet for nitrogen at the bottom of the column and outlet at the top of the column.

The composition and properties if the resulting branched polymers have been collected in Table 2.

POLYMER SYNTHESIS—EXAMPLES II-V

Branched polymers were prepared using a blend of PA46 prepolymer and a PA6 prepolymer and branched prepolymer from Example B in different ratios.

Compounding:

The branched prepolymer obtained as described above and the other prepolymers were dried at 40° C. for 16 hours under vacuum of 100 mbar. The prepolymers were compounded together with linear polymer, glass fibres and other additives in an extruder to get a homogeneous mixture of all ingredients. The processing temperature was 310° C. and the average residence time in the extruder was less than 2 minutes. The composition of the blends is listed in Table 2.

Post Condensation:

The blends obtained in the compounding step were post condensed at 190° C. to obtain a product with a desirable relative solution viscosity. The post condensation was performed in an SSPC column equipped with a heating mantle and inlet for nitrogen at the bottom of the column and outlet at the top of the column.

Results

The composition and properties if the resulting branched polymers have been collected in Table 2. Herein the mole percentage of branching monomer (X-unit) is calculated as mole % X-unit in the prepolymer, multiplied by the weight ratio of Prepol/Total polymer content in the composition.

The results with regard to sagging and moldability for the examples according to the invention are good. However, if the mole percentage of the branching monomer in the prepol becomes too high, or the content of prepolymer with a high mole percentage of the branching monomer becomes higher this easily results in gelformation, as shown by Comparative Experiments B and C. However, if the mole percentage of the branching monomer in the prepol is low, compounding with the other (pre)polymers and other components becomes more difficult, and post condensation takes a long time and the product obtained showed less good sagging and blowmoulding properties Table II.

Composition and results for Examples II and II.

|  | Examples | | | | | | | |
|---|---|---|---|---|---|---|---|---|
|  | EX-II | EX-III | EX-IV | EX-V | EX-VI | CE-B | CE-C | CE-D |
| Ingredients (wt, %) | | | | | | | | |
| Prepol IA (5 mole % X) |  |  | 6.84 |  |  |  |  |  |
| Prepol IB (10 mole % X) | 2.28 | 1.72 |  |  | 1.29 |  |  |  |
| Prepol IC (18.2 mole % X) |  |  |  | 0.95 |  |  |  |  |
| Prepol ID (25 mole % X) |  |  |  |  |  | 0.23 | 0.91 |  |
| Prepol CE A (1 mole % X) |  |  |  |  |  |  | 22.8 |  |
| BHT |  |  |  |  |  |  |  | 0.228 |
| PA46 | 33.36 | 33.64 | 22.16 | 51 | 33.74 | 34.04 | 18.2 | 34.4 |
| PA6 | 33.36 | 33.64 | 40 | 17.05 | 33.74 | 34.04 | 28.0 | 34.4 |
| Glass Fibres | 30 | 30 | 30 | 30 | 30 | 30 | 30 | 30 |
| Additive package | 1 | 1 | 1 | 1 | 1 | 1 | 1 | 1 |
| Mole % X-unit | 0.33 | 0.25 | 0.5 | 0.25 | 0.25 | 0.33 | 0.33 | 0.33 |
| Performance | | | | | | | | |
| RV | 4 | 4 | 4.3 | 3.5 | 3.8 | Gel | Gel | 3.2 |
| Sagging behaviour | Good | Good | Good+ | Good− | Good+ | n.a. | n.a. | Bad |
| Blow moldability | Good | Good | Good+ | Good− | Good− | n.a. | n.a. | Bad |
| Mechanical Properties | Good | Good | Good | Good | Good | n.a | n.a. | Good |
| Thermal Properties | Good | Good | Good | Good | Good | n.a | n.a. | Good |

The invention claimed is:

1. A branched polyamide prepolymer comprising repeat units derived from a monomer mixture comprising:
    (A) a first monomer (referred to as monomer A) which is a linear or branched aliphatic diamine having two amino functional groups, and
    (B) a second monomer (referred to as monomer B) having two carboxylic acid functional groups which is at least one selected from the group consisting of adipic acid, terephthalic acid, isophthalic acid and ester or acid chloride derivatives thereof,
    and/or a salt of monomers A and B, and
    (C) a third monomer (referred to as monomer C) which is at least one tris-amino functional compound selected from the group consisting of bis(hexamethyene)triamine (BHT), diethylenetriamine (DETA) and tris(aminoethyl)amine (TAEA), wherein
    the repeat units are present in molar amounts according to formula I and formula II:

$$Q=(MC*FC)/(MA+MB) \quad \text{(Formula I) and}$$

$$R=((MA*2)+(MC*FCA))/((MB*2)+(MC*FCB)) \quad \text{(Formula II)}$$

wherein
    MA, MB and MC represent the molar amounts of repeat units derived from the monomers A, B and C, respectively;
    FC represent the functionality of monomer C, and is equal to FC-A+FC-B;
    FC-A is the number of the amino functional groups comprised by monomer C;
    FC-B is the number of carboxyl functional groups or precursor groups thereof comprised by monomer C;
    Q is a number in the range of 0.06-1.00; and
    R is a number in the range of 0.7-1.3, and wherein
    the polyamide prepolymer has a viscosity number (VN), measured according to ISO 307, in the range of 7-30 mL/g.

2. The polyamide prepolymer according to claim 1, wherein the prepolymer has a number average molecular weight (Mn) measured by Size Exclusion Chromatography (SEC) in the range of 600-3500 g/mol.

3. The polyamide prepolymer according to claim 1, wherein the prepolymer has carboxylic acid functional end groups (CFE) and amino functional end groups (AFE) and the ratio between the number of carboxyl functional end groups (N-CFE) and the number of the amino functional end groups (N-AFE) in the prepolymer is in the range of 0.5-2.0.

4. The polyamide Polyamide prepolymer according to claim 1, wherein the prepolymer comprises repeat units derived from monomers other than monomers A, B and C in an amount of at most 20 mol %, relative to the total molar amount of monomers A, B and C.

* * * * *